Dec. 23, 1947.　　J. H. WOODBERRY ET AL　　2,433,010
CARTRIDGE HANDLING AND BELT FILLIING MACHINE
Filed July 24, 1942　　6 Sheets-Sheet 1

Inventors
John H. Woodberry
Frederick W. Hoewischer

By G. J. Kesienich · J. H. Church
Attorneys

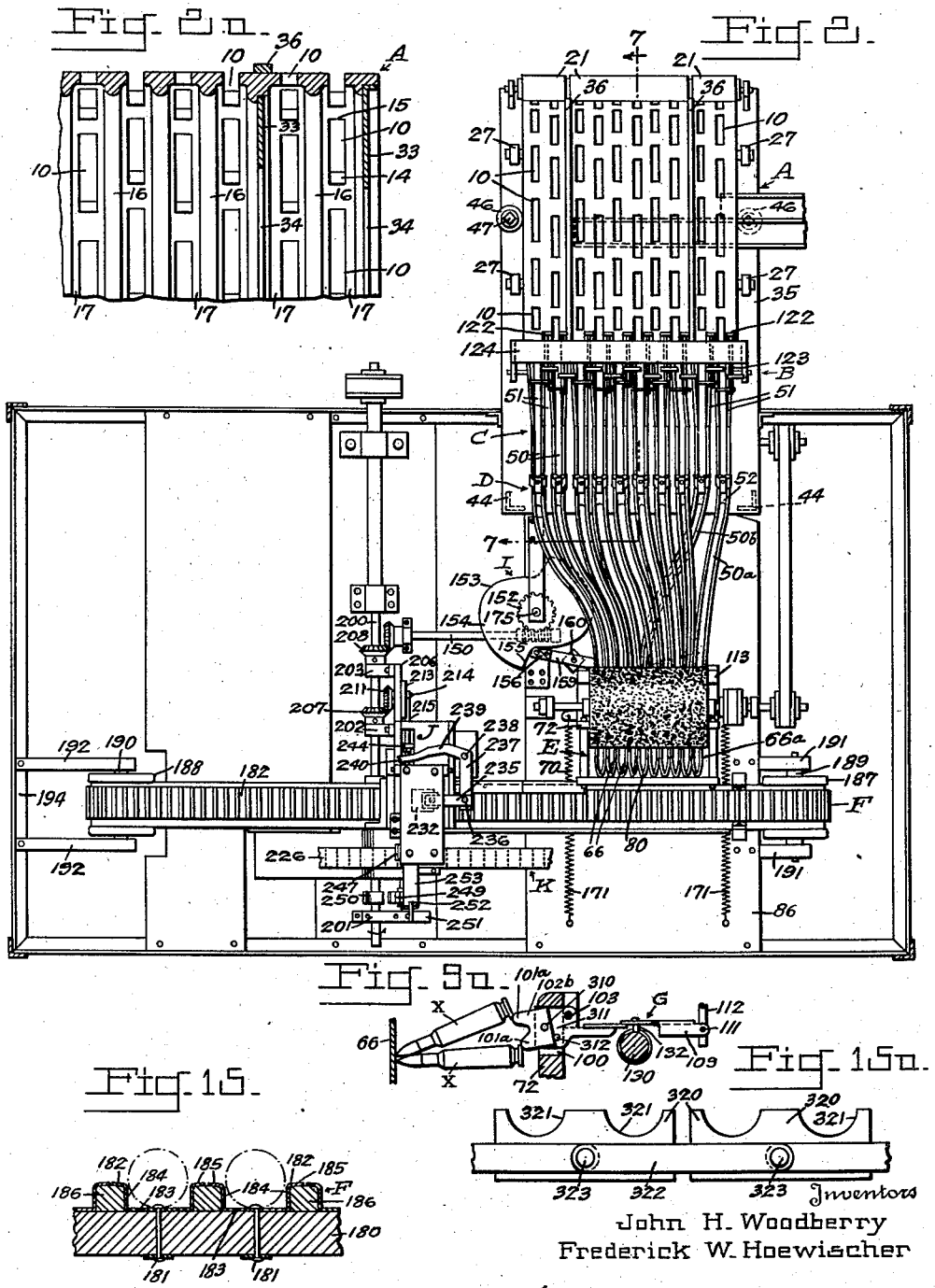

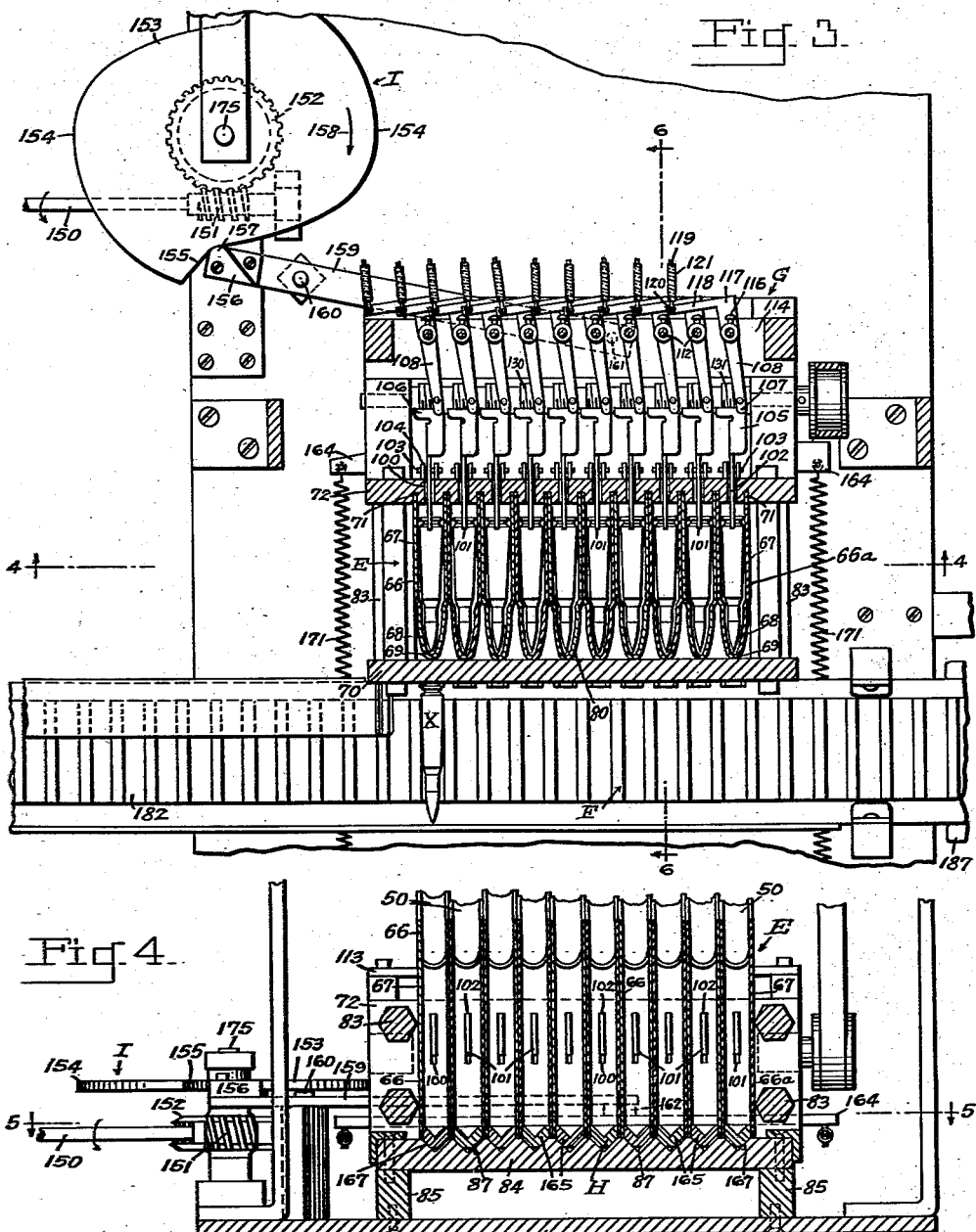

Dec. 23, 1947.  J. H. WOODBERRY ET AL  2,433,010
CARTRIDGE HANDLING AND BELT FILLIING MACHINE
Filed July 24, 1942  6 Sheets-Sheet 4
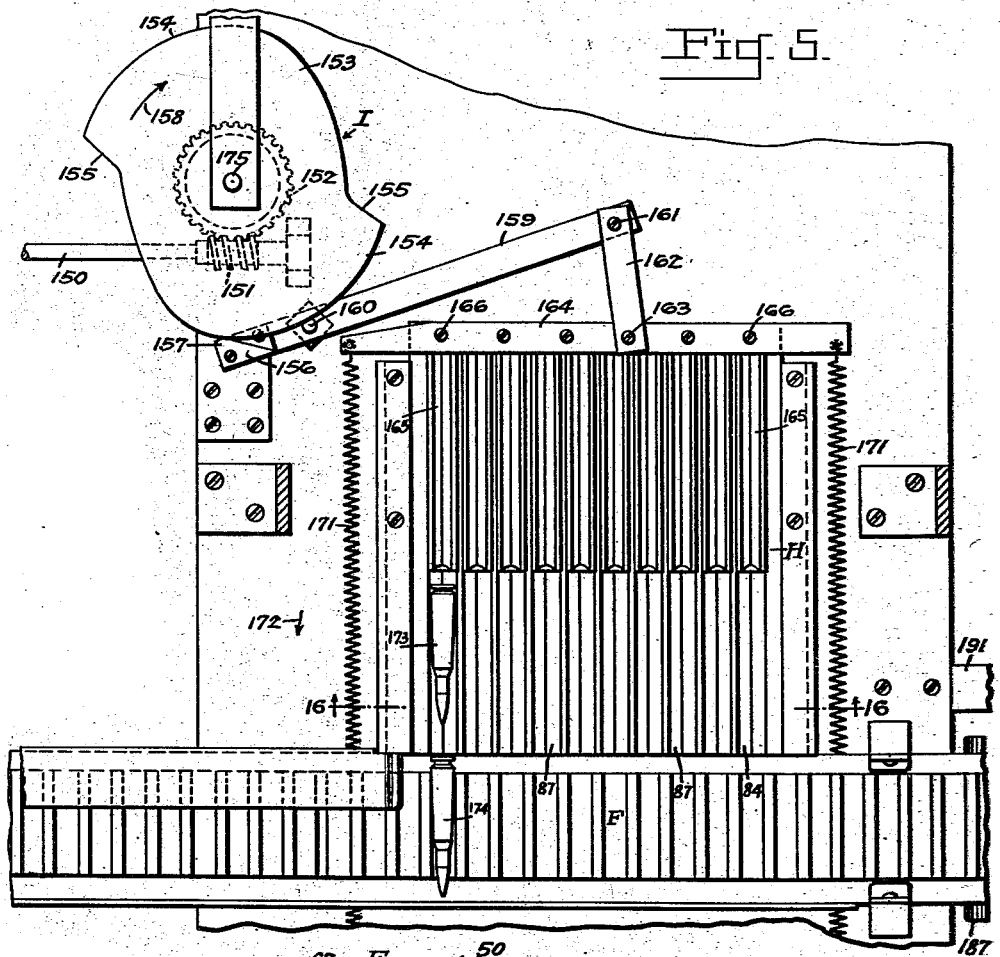
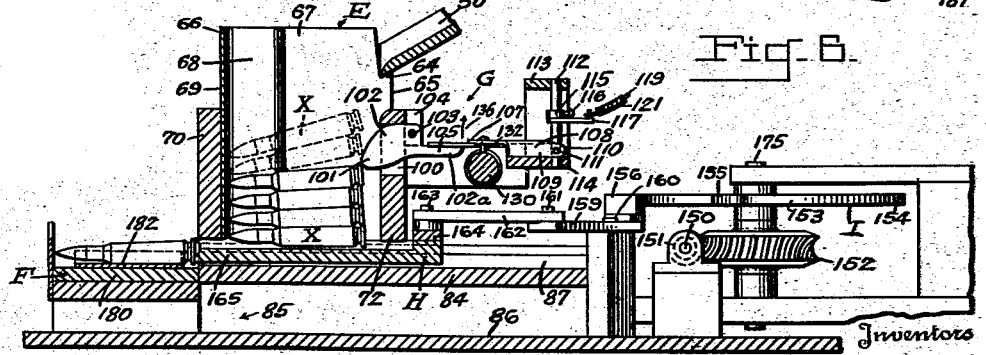
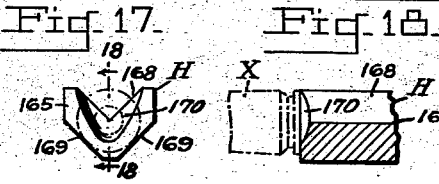
Inventors
John H. Woodberry
Frederick W. Hoewischer Dec. 23, 1947.   J. H. WOODBERRY ET AL   2,433,010
CARTRIDGE HANDLING AND BELT FILLIING MACHINE
Filed July 24, 1942    6 Sheets-Sheet 5
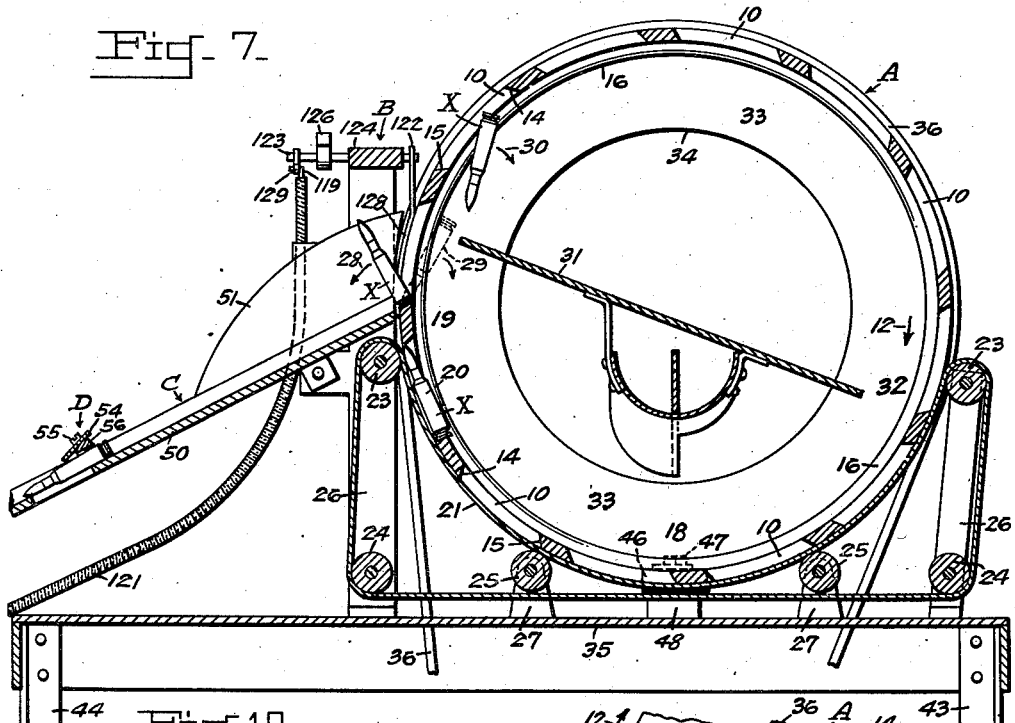
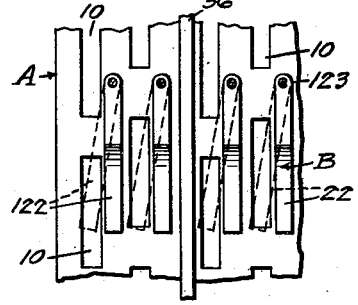
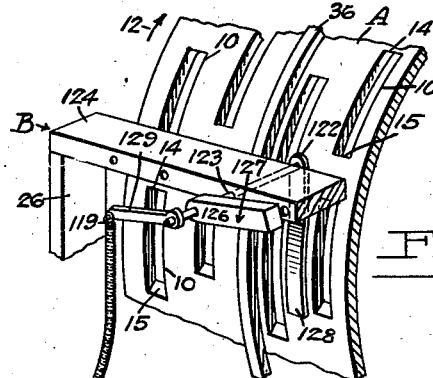
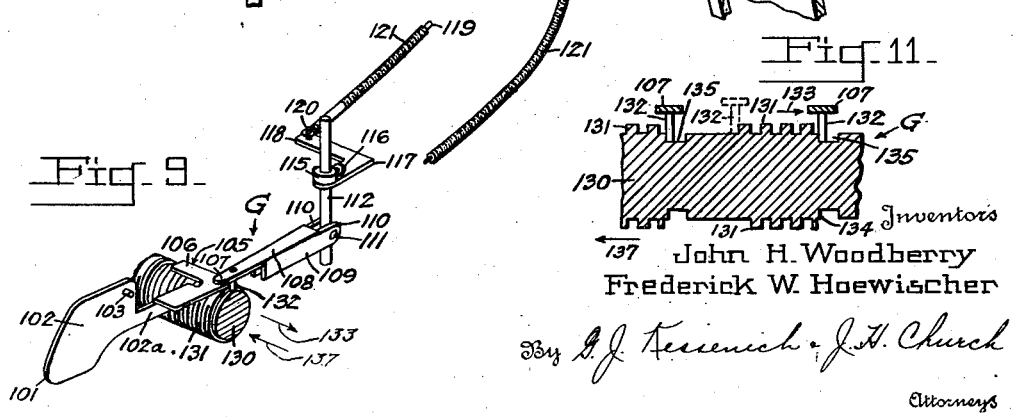
Inventors
John H. Woodberry
Frederick W. Hoewischer

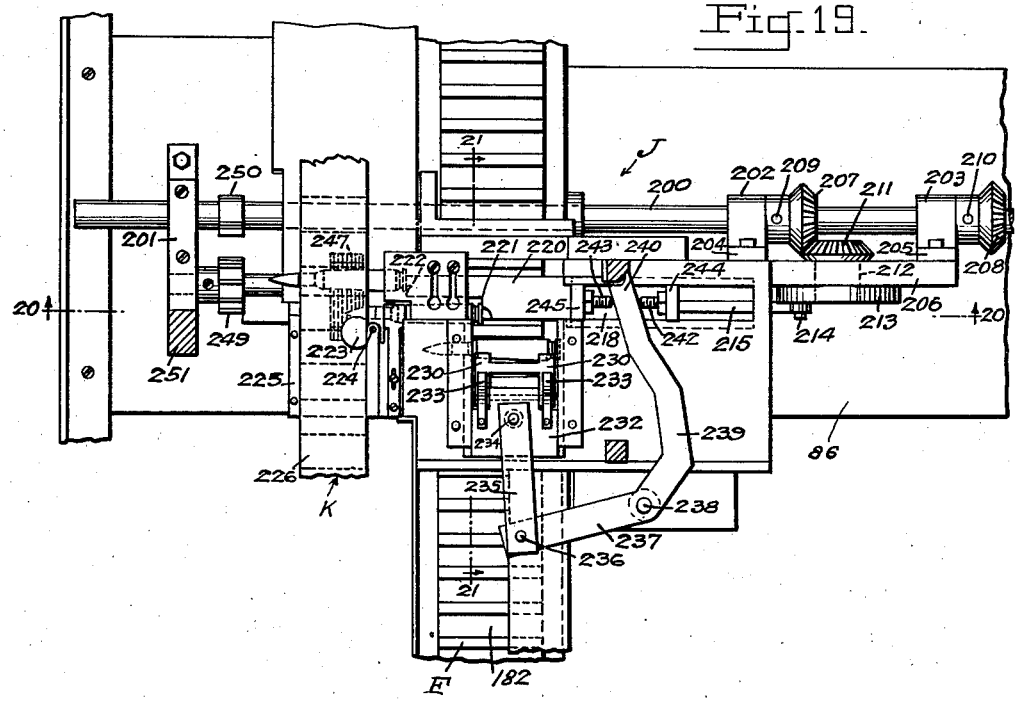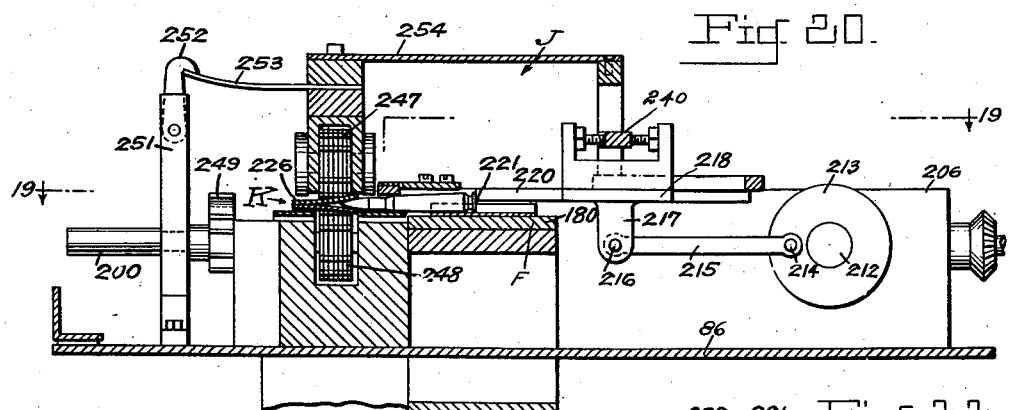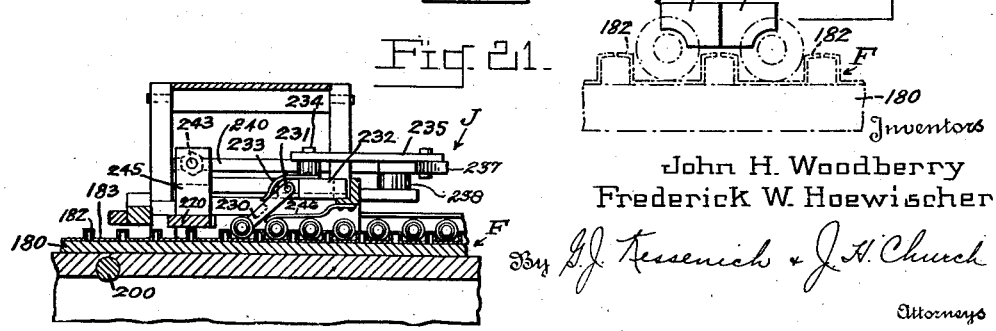

Patented Dec. 23, 1947

2,433,010

UNITED STATES PATENT OFFICE 2,433,010

CARTRIDGE HANDLING AND BELT FILLING MACHINE

John H. Woodberry, United States Army, and Frederick W. Hoewischer, United States Army, Metuchen, N. J.

Application July 24, 1942, Serial No. 452,174

7 Claims. (Cl. 86—48)

(Granted under the act of March 3, 1883, as amended April 30, 1928; 370 O. G. 757)

The invention described herein may be manufactured and used by or for the Government for governmental purposes without the payment to us of any royalty thereon.

The present invention relates to a cartridge handling and belt loading machine and particularly relates to a machine for aligning and assembling cartridges of different types in any desired relationship for filling into the fabric or disintegratable belts.

In filling cloth belts or disintegratable belts it is necessary to use considerable manual labor and it is among the objects of the present invention to provide an automatic mechanism which will largely eliminate manual labor and which will align, sort and assemble cartridges particularly of 30 caliber and 50 caliber sizes, and subsequently fill them into cloth or disintegratable belts.

According to one preferred embodiment of the present invention, the cartridges are first dumped into a rotating cylinder from which they are distributed with their noses foremost into chutes leading into bins which are positioned side by side with the bins receiving respectively ball, armor piercing, incendiary and/or tracer ammunition in any desired order or relationship.

The cartridges are then moved from these bins to a carrying belt which may receive the clips of a disintegratable belt or from which they may be subsequently loaded by suitable mechanism into a cloth belt.

In the drawings which show one embodiment according to the present invention:

Figure 2 is a top plan view of the arrangement shown in Figure 1.

Figure 2a is a fragmentary transverse sectional view of a portion of the cartridge receiving and discharging cylinder.

Figure 3 is a horizontal sectional view taken from the line 3—3 of Figure 1, upon an enlarged scale as compared to Figure 1.

Figure 4 is a vertical sectional view upon the line 4—4 of Figure 3.

Figure 5 is a horizontal sectional view upon the line 5—5 of Figure 4.

Figure 6 is a vertical sectional view upon the line 6—6 of Figure 3.

Figure 7 is a vertical sectional view upon the line 7—7 of Figure 2 illustrating the transfer of the cartridges from the cylinder into the chutes.

Figures 8 to 11 show details of a gate mechanism to control the feed of cartridges, Figure 8 being a front perspective fragmentary view, Figure 9 being a top perspective view showing a control mechanism for closing the gate to prevent further supply of cartridges, Figure 9a showing a side plan view of an alternative control mechanism, Figure 10 being a fragmentary elevational view showing the location of the closing gates in open and closed position and Figure 11 being a transverse sectional view showing a control screw with control members actuated thereby.

Figure 12:
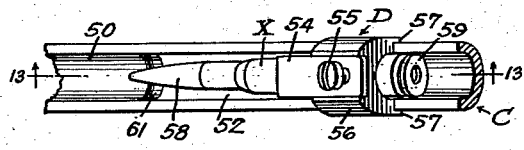
Figures 13, 14:
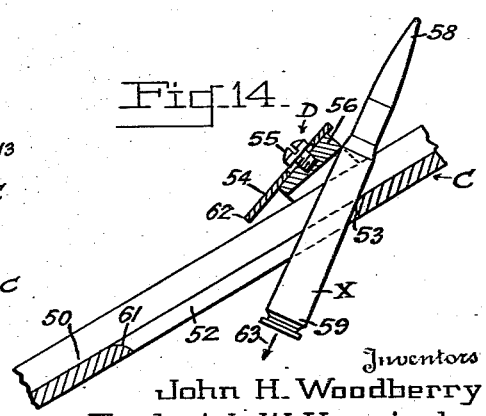

Figures 12 to 14 show an arrangement for removing cartridges from the chute system if not properly positioned, Figure 12 being a top plan view, Figure 13 being a side sectional view upon the line 13—13 of Figure 12 and Figure 14 being similar to Figure 13 showing how an improperly positioned cartridge may be discharged from the chute.

Figure 15 is a longitudinal fragmentary sectional view showing the cartridge carrier belt upon an enlarged scale.

Figure 15a is a fragmentary side view of an alternative carrier belt construction.

Figure 16 is a transverse sectional view of the bottom of the bin structure upon the line 16—16 of Figure 5.

Figures 17 and 18 show the pusher mechanism for transferring the cartridges from the bins to the traveling belt, Figure 17 being an enlarged end view of one of the pusher members and Figure 18 being a fragmentary sectional view upon the line 18—18 of Figure 17.

Figures 19 to 22 show a mechanism for placing the cartridges in the fabric belt, Figure 19 being a horizontal sectional view on line 19—19 of Figure 20, Figure 20 being a vertical sectional view upon the line 20—20 of Figure 19, Figure 21 being a vertical sectional view upon the line 21—21 of Figure 19 and Figure 22 being an end view of the second pusher arrangement, the cartridges engaged and the conveyor belt being dotted.

Figure 1:
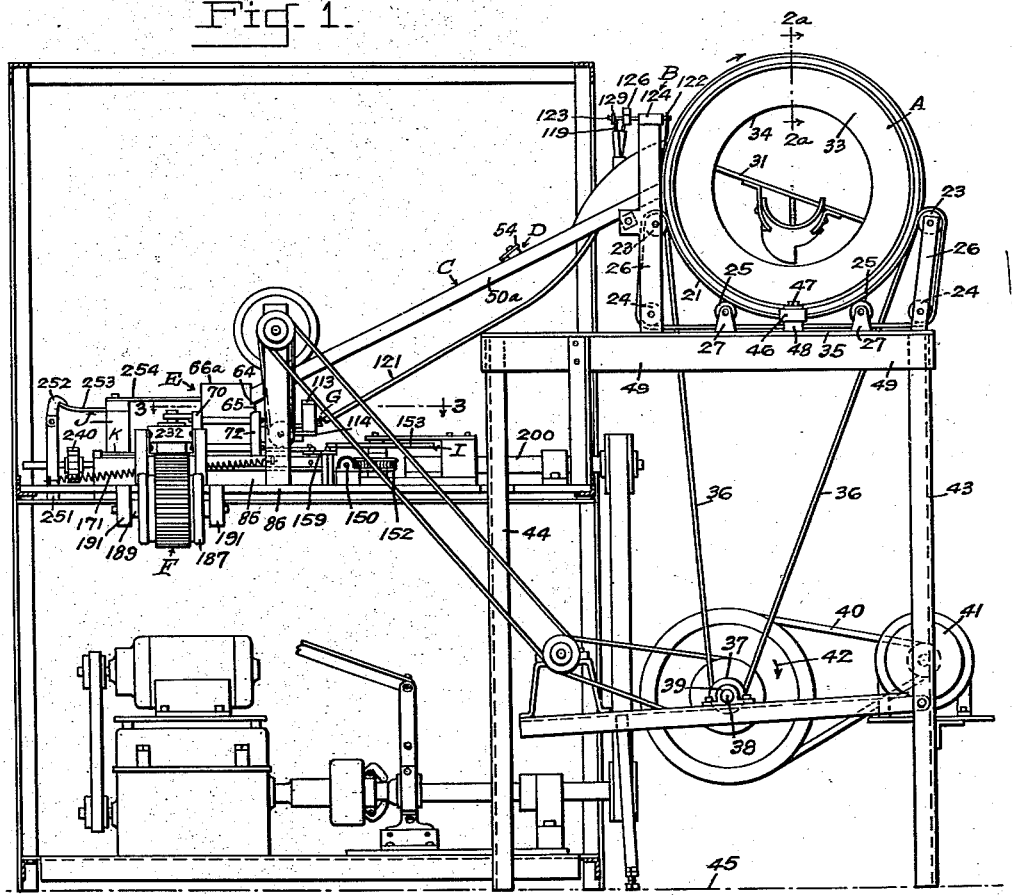
Figure 1 is a side elevation of a mechanism showing the cartridge sorting, feeding and filling mechanism.

Referring to Figures 1, 2 and 3, there is a main slowly rotating cylinder A into which the cartridges may be loosely dumped. This cylinder A may be partitioned into a number of compartments in which different types of cartridges, such as ball, incendiary, armor piercing, tracer, etc., may be positioned.

From the continuously rotating cylinder A the cartridges are transferred past the gate mechanism B which cuts off the discharge of cartridges from the rotating cylinder A when a sufficient quantity has been supplied to the chute structure C.

The chute structure is provided with a discharge or discard means D shown best in Figures 12 to 14, which serves to discharge and remove cartridges which are not properly positioned when they leave the rotating cylinder A.

The magazine or bin structure E receives the cartridges and holds them in position to be placed upon the carrier belt F.

At the rear of the bins E which form the magazine are positioned the control mechanisms G (shown particularly in Figs. 3, 6, 9 and 11), which will carry the mechanism B to prevent discharge of cartridges from the rotating cylinder A when a sufficient supply has been received in the bins or mechanism E.

The pusher mechanism H which is shown in small scale in Figure 6 and in large scale in Figures 4, 17 and 18 is actuated by cam driving means I (see particularly Figures 3, 4, and 5).

From the carrier belt F, cartridges are transferred into the belt loading mechanism J shown in small scale in Figure 2 and in large scale in Figures 19, 20 and 21.

The belt feeding mechanism J will load the cartridge into a final ammunition belt indicated at K which may receive 250 cartridges.

Referring to Figures 1, 2 and 7, the cylinder A may be made from a large piece of tubing or of a series of die cast sections bolted together. In the periphery thereof, there are formed a large number of openings or slots 10, which are of oblong rectangular shape as is more fully shown in Figures 7 and 8. The material at the ends of the slots is of a thickness about three-fourths the diameter of the cartridge base.

As shown in Figures 7 and 8 the slot opening 10 has straight sides and the upper and lower edges 14 and 15 respectively as shown best in Figure 7 are cut into cylinder A at an angle of about 30 degrees to the radius, inclined outward and opposite the direction of rotation. The lower limiting edge of the slot at the ascending side of the cylinder is thus at the inner face of the cylinder while the upper limiting edge is at the external face.

The rows of slot openings 10 extending circumferentially around the drum A are preferably spaced apart by at least a distance slightly more than the diameter of a cartridge.

Between the rows of openings 10 are provided interior circumferential ridges 16 (see Figure 2a) which cause the cartridges to move into the channels 17, Fig. 2a, into which the openings 10 extend.

As is indicated in Fig. 7, the cartridges X will fall into position as the openings move from the point 18 to the point 19 and a cartridge is shown at position 20 as having fallen into proper position in the opening or slot 10.

From position 18 to position 19 a belt 21 will keep in contact with the lower portion of the cylinder and will prevent any cartridges from falling out through the openings or slots 10. This belt 21 is carried by the pulleys 23, 24 and 25 which are mounted upon the framework 26 and 27.

As the cartridges X pass above the position 19 those with the nose turned upwardly will fall out in the direction 28 so that they will slide down the chute structure C with their noses foremost.

This occurs since the cartridges properly positioned in the slots 10 upon passing above the position 19 will have a center of gravity a substantial distance outward of the bearing of the cartridge on the edge of the opening tending to cause them to pivot and fall in the direction 28.

On the other hand, if the cartridges fall in the slots with the noses downward as indicated, e. g., by the dotted lines at 29 in Figure 7 the center of gravity will be inwardly of a vertical line from the nose of the bullet such that the cartridge will tend to fall inwardly as indicated at 30 back into the rotating cylinder A and upon the plate 31 which will guide them to the position 32 so that they do not fall upon and mar or scratch the cartridges at or adjacent position 18.

Plates 33 constituting a diametrical annular partition with central openings 34 may be positioned in the drum at intervals to divide the cylinder A into separate compartments and different types of cartridge may be placed on respective sides of the interior partition 33. The space between two adjacent plates 33 should not be less than the length of a cartridge.

The cylinder A rotates upon the rollers 25 which are supported by the brackets 27 from the base plate 35 and it is driven by the belts 36 which extend downwardly as best shown in Figure 1 to the pulley 37 on the countershaft 38. The shaft 38 rotates in the bearing 39 and is driven by a belt 40 from the motor 41 in the direction indicated by the arrow 42 in Figure 1. The base plate 35 for the brackets 27 is supported upon the framework 49 which in turn is supported by the verticals 43 and 44 which extend down to the floor 45.

The cylinder A while rotating is held in lateral position by side rollers 46 which rotate upon the pivots 47 and the brackets 48 mounted on the table 35.

The chute structure C is best shown in Figures 2, 4 and 7 and it consists of a series of closely spaced parallel channels 50 diverging adjacent the cylinder A. These channels are separated at the opening of entry of the cartridge X (see Figure 7) by the downwardly convering side members 51 which deflect the cartridge inwardly and downwardly into the channels 50.

If by chance one cartridge falls on another when dropping into the channel and becomes turned so that the enlarged base end is foremost instead of the pointed end, the arrangement D shown best in Figs. 12 to 14 will discharge such cartridges out of the channels 50 of the chute structure C.

This element D (Figs. 7, 13 and 14) includes an opening or slot 52 in the bottom of the channel 50 equal in width to the diameter of the cartridge base and positioned above the beginning 53 of the slot is the deflector plate 54 which inclines downwardly away from the drum and is mounted adjustably by the screw 55 upon the block 56. The block 56 is mounted by the shoulders 57 (see Figure 12) on the sides of the channel 50.

Figures 12 and 13 show the action of the deflector D when the cartridge is sliding down through the slot structure C in proper position with the point or narrow portion 58 foremost and with the case or base portion 59 rearmost.

As the cartridge X passes downwardly at relatively high velocity, as is indicated by the arrow 60, its nose 58 will pass beyond the slot 52 and the round will then slide on the lower rounded edge 61 of the slot 52.

The momentum of the cartridge X will carry it past the slot 52 even though the base portion 59 may slightly dip into the slot 52 as it passes under the lower edge 62 of the deflector plate 54.

However, when the base portion 59 is foremost as indicated in Figure 14, the cartridge X will be deflected downwardly by the forward part 62 of the plate 54 and will fall, somewhat as indicated by the arrow 63 out of the chute structure C.

In this manner an improperly directed cartridge X will be discarded and no reversed rounds will reach the bins or magazine structure B.

As is best shown in Figures 4 and 6, the lower ends of the channels 50 of the chute structure C will rest on the shoulders 64 at the back edges 65 of the bin members 66.

The bins 66 are positioned closely beside each other as indicated best in Figures 3 and 4. The bins 66 are provided with the side walls 67 which converge forwardly toward each other as indicated at 68 and terminate at the narrowest forward portion 69 so that they approximate in cross section the outline of cartridge X, which has passed thereinto from the chute structure C.

As shown in Figures 3 and 4 there are ten bins 66 positioned closely adjacent to each other with their side walls 67 in contact and in one desired arrangement the first four of these bins from the left receive ball ammunition, while the fifth receives tracer ammunition—this pattern is repeated for the next five bins toward the right.

To obtain this arrangement of cartridges in the bins 66 forming the magazine structure E, the first two rows of slots 10 of cylinder A toward the right in Fig. 2 and Fig. 2a are separated by the internal partition 33 from the remaining slots, and in this end of the cylinder A the tracer ammunition is placed.

On the other side of the interior plate 33 the ball cartridges are placed.

By referring to Figure 2, it will be noted that the ball cartridges from the left side of the cylinder A will move down through the first eight channels 50 from the left of Figure 2 and will supply the first four bins from the left and also the sixth to the ninth from the left with the result that these bins will become filled with ball cartridges, the projectile portions of which will all be directed forwardly.

On the other hand, the tracer cartridges from the first two rows of slots 10 at the right will pass through the two channel members 50 on the extreme right. One channel member 50a (see Figure 2) will feed the bin 66a at the extreme right, while the other channel member 50b will pass under channel members for the ball cartridges leading to bins 2 to 5 and will deposit its tracer ammunition in the sixth bin as indicated at the position 80 in Figure 2.

The bin structure 66 is best shown in Figures 3, 4, 5 and 6 and supported by the structure consisting of the front wall member 70, the rear wall member 72, side structures 83 and the floor 84.

The rear edges of the bin walls 67 fit into slots 71 in the wall 72.

The floor 84 at the bottoms of the bins is supported by the posts 85 from the base 86 (see also Figure 16). The floor 84 is provided with V-shaped grooves 87 under respective bins 66 and which receive the cartridges X (see particularly Figure 16) stacked one above the other in the manner shown in Figure 6.

When an excess number of cartridges is stacked in the bins 66, the safety mechanism adjacent to bin structure 66 as shown in Figures 3, 6, 9, and 11 becomes operative. As shown best in Figures 4 and 6, the rear wall 72 of the bin structure is provided with slots 100 through which project the noses 101 of the plates 102 (see Figure 9).

The plate 102 is provided with a pin 103 which is pivotally mounted between projecting plate members or ears 104 extending from the rear wall 72 (see Figure 3). The plate 102 as best shown in Figure 9 has a horizontal rearward extension portion 102a with an L-shaped horizontal shelf 105. The base 106 of the L-structure 105 fits under the nose 107 of the channel lever member 108. The depending side flanges 109 of the channel member 108 have rearwardly extending ears 110 which carry the pin 111 passing through a vertical rod 112.

The rod 112 is pivotally mounted, as best shown in Figure 6, in an upper plate 113 and the lower plate 114, and it carries an intermediate collar 115. The collar 115 is fixed in position on the rod by the set screw 116. The collar 115 has an operating arm member 117 fixed thereon (see particularly Fig. 9).

The arm 118 of the member 117 has a cable 119 attached thereto by the connection 120 which extends through the cable casing 121.

The cable 119 actuates the gate structure best shown in Figs. 8 and 9.

There is one plate or nose piece 101 extended into each bin 66, and the nose portion is normally located a distance above the bottom of the bin sufficient to accommodate a predetermined maximum number of rounds there below in the bin. The nose extends into the bin a sufficient distance however to engage the base of a horizontally disposed or slightly inclined cartridge in the bin.

The axis of the pin 103 is so located (Fig. 6) above a limit of partial filling desired, however, and the radius of the nose point is such, that when the desired base number of cartridges is in the chamber stacked in close vertical alinement, the upper side of the butt of the topmost one will be just without the arc of the lower part of movement of the extremity of the nose, but the nose is held at a higher position by the weight of the members 106 and 108, so that after the base number has been introduced, the next cartridge will depress the nose and will not be able to move below the radius of the nose and plate 102, and so, either alone, or with a succeeding cartridge will hold it depressed. This (through parts 105—107) frees the pin 132 from the threads 131 of a constantly operating screw 130 to be described, so that the latter are not able to hold the arm 108 to the right, and the arm 108 will be free to slide to the left along the base arm 106 under automatic closing operation of a gate 128 to be further described, at the gate mechanism B first mentioned. This prevents escape of any more cartridges from the cylinder A to the chute 50 leading to the particular bin in which the operated plate 102 is located. A few cartridges, if any, already in the chute may complete their movement to the bin, and will remain as dotted in Fig. 6, until sufficient rounds have been removed by loading operations (as will be described), when they may pass below the nose piece because their pointed ends will fall when not supported by underlying rounds.

In the alternative contact construction shown in Fig. 9a (correspondingly functioning parts being indicated by the same numerals), the plate 102b having two nose portions 101a is pivotally mounted at 310 on the base plate 311 (pivoted at 103) which has a stop pin 312 to limit downward pivotal movement of the nose piece 102b.

When cartridges X press on both noses 101a, then the pin 132 will be released in the manner previously described.

The gate structure 128 includes a plurality of swinging gates 122, one for each row of the slots 10 for the cartridges in the cylinder A. These gates 122 are pivotally mounted upon the rods 123 which extend through the bar 124 mounted upon the side structures 26.

The pivot rod 123 carries the weighting member 126 normally biasing it downwardly in the direction 127 (see Fig. 8) so that the gate 122 and particularly the curved lower portion 128 will tend to extend over and block the outlet of the passing slots 10.

Normally, however, the gate 122 together with its lower portion 128 will be positioned so as not to block the slot openings 10 but permits the free flow of cartridges as indicated in Fig. 7. This will be accomplished by the cable 119 pulling downwardly on the lever 129 which is attached to the end of the pivot rod 123.

The cable 119 is normally actuated to hold the gate 122 out of such blocking position by the continuously rotating screw 130, shown best in Figure 11 and also in Figures 6 and 9. The screw 130, as best shown in Figure 11, has a series of square threads 131, which are interrupted, one series being provided for each bin 66. Set in these threads are the pins 132 extending downwardly from the noses 107 of the U-shaped channel members 108 and normally these pins will be moved in the direction 133 by the continuous rotation of the screw 130.

It will be noted from Figure 11, that when the pin 132 reaches the end 134 of the thread 131 it will move into a circumferential annular slot 135 and will be held in said slot drawing the cable 119 downwardly, and disengaging the gate 122—128 of Figure 8 through the vertical pivot rod 112, the angle member 117, and the channel member 108.

However, where a sufficient supply of cartridges collects in any bin 66, the upper two cartridges X shown in dotted lines in Figure 6 will press the nose 101 of the plate 102 downwardly moving the member 105 upwardly as indicated by the arrow 136 in Figure 6 and disengaging the pin 132 of Figure 11 from the groove 135 with the result that the pin 132 will be moved in the direction 137 (Fig. 9) and the gate 122 will move from solid line position to dotted line position as best shown in Figure 10, blocking the outlet of the row of openings 10.

This movement of the gate 122—128 will prevent further passage of cartridges through the corresponding row of openings 10 with the result that the bins 66 will not again receive cartridges until the cartridge level has dropped below the nose 101.

Normally, with three or less cartridges in a bin, when the cartridges X drop into the bin 66 from the chute 50 they will have an inclination greater than indicated at the dotted line position in Figure 6, so that their butts will clear the nose 101 of the plate 102.

The pusher mechanism H which is best shown in Figures 3, 4, 5, 6, 17 and 18, is driven, as particularly shown in Figure 6, by the shaft 150 and the worm 151 which drives the wheel 152. The wheel 152 is attached to and drives the cam 153 with the lobes 154 and the shoulders 155.

A follower lever 159 is shown having a rounded nose 156 (see Figures 3 and 4) which slides over the contour of the cam turning in the direction 158. The lever 159 is pivotally mounted at 160 and is connected by the pivot pin 161, link 162 and pin 163 to a bar 164 carrying parallel pusher fingers 165, the cross sectional V-shape of which is best shown in Figures 4, 17 and 18.

These pusher members are connected by studs 166 to the bar 164 and they are of V-shaped cross section as best shown by the cross section 167 in Figure 4, sliding on the floor 84 in respective grooves 87.

Each of these pusher members 165 is provided with a V-shaped groove 168 (see Figure 18), which receives the lowermost cartridge in the bin (see also Figures 4 and 16).

The front of the pusher members 165 are also recessed at 170 so as to clear the primer of the cartridge X as indicated in dotted lines in Figure 18.

To the ends of the bar 164, shown best in Figure 5, are connected springs 171 which bias the bar in the direction 172 and tend to press the fingers 165 forwardly to move the cartridges as shown in Figure 5 from position 173 to position 174 in the carrier belt structure F.

The springs 171 will cause the follower 157 abruptly to move closer to the center 175 of the cam 153 twice in each revolution of the cam as the follower 157 passes on to the shoulders 155 from the lobes 154. Upon each passage of the follower 156 over the shoulder 155, the pusher members 165 will move forwardly, as indicated at 172, pushing ten cartridges from the V-grooves 87 of Figure 16 onto the carrier belt F.

This arrangement of cartridges X in the bins 66 will be respectively, e. g., 4 with ball, 1 with tracer, 4 with ball, and another tracer.

The carrier belt structure F is shown in small view in Figures 1 and 2 and in detail in Figures 3 and 15.

Referring to Figure 15, the carrier belt consists of a canvas element 180 to which are riveted or bolted as indicated at 181 the U-shaped members 182 at their bases 183. The side flanges 184 of the U-shaped members 182 are provided with the upwardly and outwardly extending flanges 185 which receive the spacer members or bars 186 to support the flange members. The belt as best shown in Figure 2 is carried on the rollers 187 and 188 which are revolubly mounted at 189 and 190 on the supporting brackets 191 and 192 which are in turn mounted upon the base 86.

In the alternative construction shown in Figure 15a, the blocks 320 have the grooves 321 to receive the cartridges. These blocks 320 are linked together by the links 322 and pivot pins 323. The linked block construction of Figure 15a can replace the fabric belt F and is less susceptible to stretching.

The belt is moved forwardly by the belt filling mechanism which is best shown at J in Figures 19 to 22.

Referring to belt filling mechanism, this mechanism is driven by the shaft 200 (see Figure 19) which has bearings at 201, 202 and 203. The bearings 202 and 203 are mounted on the bases 204 and 205 which in turn are mounted upon the structure member 206.

Adjacent to bearings 202 and 203 are positioned the bevel gears 207 and 208 which are fixed upon the shaft 200 by the set screws 209 and 210.

The bevel gear 207 drives the bevel gear 211 which extends at 212 through structure member 206 and connects at its other end to the crank disk 213.

The crank 213 is pivotally connected at 214 to the link 215. The link 215 is connected at 216, Fig. 20, with the rear 217 of the slider member 218. The slider member 218 carries the pusher member 220 having a pusher face 221 for contacting the cartridge and forcing its nose from the carrier belt F into part engagement with belt K and the more advanced pusher member 222 for consecutively forcing home the cartridge into the fabric belt K.

The operation and construction of the belt filling mechanism is more fully shown and described in application Ser. No. 418,991, filed November 13, 1941, and also in Patents Nos. 660,244, dated October 23, 1900, and 1,401,147, dated December 27, 1921, the present description merely being for the purpose of emphasizing certain changes and modifications and to enable a better understanding of the complete mechanism.

The pusher member 220 cooperates with the shuttle member 223 which is pivotally mounted at 224 upon the base plate 225. This shuttle member 223 opens the pockets 226 of the fabric belt K enabling initial insertion of the nose of the cartridge X by the rear face 221 of the pusher 220.

Following this initial insertion, the carrier belt F and the belt K, are advanced one position by the mechanism to be now described whereupon the partly inserted cartridge is driven home into final position in the cotton belt by the advanced face 222 of the pusher member 220.

The advancing of the carrier belt F is accomplished by the fingers 230 which press against the first cartridge in the carrier belt F. These pusher fingers 230 are pivotally mounted at 231 (Fig. 21) on the reciprocable member 232, fingers 230 being held down by the spring 233. The member 232 is pivotally connected at 234 to the link 235 which in turn is connected at 236 to the bell crank lever 237.

The lever 237 is pivotally mounted at 238. For its operation, the portion 239 of the lever 237 has an end portion 240 located between the adjustment screws 242 and 243 which are carried by the up-rights 244 and 245 rigidly erected on the slider 218.

As the slider 218 reciprocates backwardly and forwardly together with the pusher member 220, it also reciprocates the lever 237 which presses the belt F forwardly through the pusher fingers 230 and cartridge cases. Upon reverse motion, the fingers 230 will pass over the top of the next cartridge while the spring 246 holds such cartridge in position in the carrier belt F.

The fabric belt K carrying the cartridges also is advanced at the same time by the upper star wheel 247 and the lower star wheel 248, the lower star wheel being on a shaft turned by a ratchet member 249 and the rotating single tooth member 250.

The upright 251 is provided with a latch hook 252 which holds down the spring member 253 on the cover 254 which carries the upper star wheel 247 as shown best in Figure 20.

In operation, the cartridges will be placed in the cylinder A and will move down the cylinder through the openings 10 into the chute structure C. Any cartridge X which may have been improperly positioned will be ejected by the mechanism D as best shown in Figures 12, 13 and 14. The cartridges will then slide down the chute structure into the bin structure E.

From the bin structure E the cartridge will be advanced by the pusher structure H (Fig. 5) and the driving mechanism I into the carrier belt F. From the carrier belt F the belt filling mechanism J will feed the cartridges into the fabric belt K in the manner best shown in Figures 19 and 20 and 21.

When an excess of cartridges is received in the bin structure E as shown in Figure 6, the central mechanism G (Fig. 6) will actuate the gates 122 as indicated at B in Figure 1 to cut off the flow of cartridges until the supply of cartridges on hand has been decreased by the reciprocating member H, and the carrier belt F.

It is thus apparent that the present invention has provided a belt loading mechanism and a cartridge handling mechanism by which it is possible to mount the cartridges in a final ammunition belt in any order or sequence and position them in the fabric belt or without manual intervention by relatively simple automatic apparatus.

We claim:

1. A device for limiting the stacking of articles fed from a supply point to a stack magazine, in combination, a gate pivotally mounted and adjacent the path of the articles loaded to turn to closing position across said path, a pivotally mounted lever having a forward arm projecting into the said magazine and adapted to be turned by the uppermost of a stack of a predetermined number of articles in the magazine, the rearward arm of the said lever being provided with a laterally extending ledge, a vertically disposed shaft, a lever pivoted in fixed radial relation to the shaft, the distal end of the said lever being provided with a depending pin, operative connection between the said shaft and the said gate, a constantly rotating shaft provided with a screw thread receiving the said depending pin when the lever is at the lower limit of its movement whereby the lever and its said vertical shaft are turned in a direction to maintain the said counterweighted gate in open position, the distal end of the pinned lever overlying the said lateral ledge of the magazine lever whereby the said pinned lever is raised by the said turning of the magazine lever to lift said pin from the said screw thread, permitting the counterweight to turn the gate to closing position.

2. A device for stacking a predetermined number of articles fed from a supply point to a magazine, in combination, a gate pivotally mounted at the said supply point and loaded to turn to closing position, a pivotally mounted lever having a forward arm projecting into the said magazine and adapted to be turned by a stack of the said predetermined number of articles, the rearward arm of the said lever being provided with a laterally extending ledge, a lever mounted for turning in the plane of the said ledge and also normal thereto, the distal end of the said lever being provided with a depending pin, an operative connection between the said lever and the said gate, a constantly rotating shaft provided with a screw thread receiving the said depending pin whereby the said lever is turned in a direction to maintain the said counterweighted gate in open position, the distal end of the said lever overlying the said lateral edge of the magazine lever whereby the said lever is raised by the said turning of the magazine lever to lift its said dependent pin from the said screw thread, permitting the counterweight to turn the gate to closing position.

3. In a machine for loading cartridges into belts, a hopper adapted to hold cartridges in stacked relation and having a lateral discharge opening at the lower part, a belt device having transverse pockets therein, means to move the belt past the discharge opening of the hopper in cartridge receiving relation thereto, means to transfer the lowermost cartridge from the hopper to the belt device, means to orientate and deliver cartridges to the hopper, and means to stop said delivery including an operating means responsive to a cartridge in excess of a predetermined number of cartridges in the hopper.

4. The structure of claim 3 in which the operating means includes a lever pivoted outwardly of the bases of cartridges in the hopper and adjacent the uppermost level to which it is desired to fill said hopper, said lever having an arm extending into the hopper and movable in line with the direction of movement of the cartridges through the hopper, its extremity being movable in an arc from above and inward of the butt of the cartridge at said level downward close to and outwardly of the top of the uppermost cartridge at the stack in the hopper, and a member operatively connected to the lever and movable thereby across the path of cartridges from said means to deliver cartridges to the hopper, said means constructed to tend to move clear of said path.

5. In a machine of the character described, a magazine for stacked cartridges, cartridge feeding means for feeding cartridges in succession to the top of the magazine, feed stop means operable to stop feeding of cartridges by said cartridge feeding means including means in said magazine responsive to entry of a cartridge in excess of a predetermined number in the magazine at any one time constructed and arranged to operate the said feed stop means.

6. The structure of claim 5, wherein the said feed stop means includes a spring loaded vertically movable finger projecting into the said magazine constructed and arranged to be engaged by and yield to passing cartridges entering the magazine so as to clear cartridges fed into the magazine when such cartridges move below a predetermined level and so that said finger will be moved and held at a lowered position by the uppermost cartridge of a stack in the magazine at said level or immediately thereabove, a gate device being included in said feed stop means, located adjacent and movable into the path of cartridges in course of movement by said cartridge feeding means, and operative connections between said finger and said gate device to move the latter across said path on operation of the finger by said uppermost cartridge.

7. In a machine for the purpose described, a cartridge feeding means, a magazine in receiving relation to the said feeding means constructed to receive and support a plurality of cartridges in stacked relation one above another therein, a cut-off device for the said feeding means movable to cut-off position in the path of cartridges in the said feeding means, means to hold the cut-off device normally at a clear position to permit movement of cartridges in said path, and operating means in said magazine connected to the cut-off device engageable by entering cartridges and responsive to the entry of a cartridge to the magazine in excess of a predetermined number, to move said cut-off device to said cut-off position.

JOHN H. WOODBERRY.
FREDERICK W. HOEWISCHER.

REFERENCES CITED

The following references are of record in the file of this patent:

UNITED STATES PATENTS

| Number | Name | Date |
|---|---|---|
| 952,477 | Stillwell | Mar. 22, 1910 |
| 1,195,054 | McLeod | Aug. 15, 1916 |
| 1,325,339 | Swasey | Dec. 16, 1919 |
| 1,377,395 | Calleson | May 10, 1921 |
| 1,388,065 | Schmitz | Aug. 16, 1921 |
| 1,395,928 | Northover | Nov. 1, 1921 |
| 1,408,497 | Bragdon | Mar. 7, 1922 |
| 2,123,915 | Rodler | July 19, 1938 |

FOREIGN PATENTS

| Number | Country | Date |
|---|---|---|
| 57,327 | Denmark | Feb. 26, 1940 |
| 539,184 | Great Britain | Sept. 1, 1941 |